US011950322B2

(12) United States Patent
Mildh et al.

(10) Patent No.: US 11,950,322 B2
(45) Date of Patent: Apr. 2, 2024

(54) STORAGE OF UE CONTEXTS IN RAN FOR INACTIVE UES

(71) Applicant: Telefonaktiebolaget LM Ericsson (publ), Stockholm (SE)

(72) Inventors: Gunnar Mildh, Sollentuna (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 52 days.

(21) Appl. No.: 15/549,799

(22) PCT Filed: May 19, 2017

(86) PCT No.: PCT/SE2017/050537
§ 371 (c)(1),
(2) Date: Aug. 9, 2017

(87) PCT Pub. No.: WO2017/200481
PCT Pub. Date: Nov. 23, 2017

(65) Prior Publication Data
US 2018/0234838 A1 Aug. 16, 2018

Related U.S. Application Data

(60) Provisional application No. 62/339,518, filed on May 20, 2016.

(51) Int. Cl.
*H04W 8/22* (2009.01)
*H04W 60/02* (2009.01)
(Continued)

(52) U.S. Cl.
CPC ............. *H04W 8/22* (2013.01); *H04W 60/02* (2013.01); *H04W 76/30* (2018.02); *H04W 8/245* (2013.01);
(Continued)

(58) Field of Classification Search
CPC ....... H04W 8/22; H04W 76/30; H04W 60/02; H04W 76/28; H04W 8/245;
(Continued)

(56) References Cited

U.S. PATENT DOCUMENTS 7,541,977 B2 * 6/2009 Ali .................. H04W 60/02
455/456.2
8,515,475 B2 * 8/2013 Chen .................... H04W 76/34
725/62
(Continued)

FOREIGN PATENT DOCUMENTS

CN 1925381 A 3/2007
CN 104823478 A 8/2015
(Continued)

OTHER PUBLICATIONS

International Preliminary Report on Patentability for PCT/SE2017/050537, dated Aug. 20, 2018, 5 pages.
(Continued)

*Primary Examiner* — Kibrom T Hailu
(74) *Attorney, Agent, or Firm* — Withrow & Terranova, PLLC

(57) ABSTRACT

Systems and methods are disclosed herein that relate to configuration of a periodic updating timer for, e.g., a Radio Access Network (RAN)-controlled inactive state. In some embodiments, a method of operation of a RAN node in a cellular communications network comprises configuring a User Equipment (UE) with a timer value T for a periodic updating timer. In this manner, the RAN node is able to configure the UE with a time value T, e.g., for use by the UE for providing periodic update messages while the UE is operating in an inactive state such as, e.g., a RAN-controlled inactive state.

22 Claims, 11 Drawing Sheets

(51) Int. Cl.
  *H04W 76/30* (2018.01)
  *H04W 8/24* (2009.01)
  *H04W 52/02* (2009.01)
  *H04W 76/28* (2018.01)
  *H04W 84/04* (2009.01)

(52) U.S. Cl.
  CPC ........ *H04W 52/0209* (2013.01); *H04W 76/28* (2018.02); *H04W 84/045* (2013.01); *Y02D 30/70* (2020.08)

(58) Field of Classification Search
  CPC ........... H04W 52/0209; H04W 84/045; H04W 24/10; Y02D 70/1224; Y02D 70/21; Y02D 70/1262; Y02D 70/1242
  See application file for complete search history.

(56) References Cited

U.S. PATENT DOCUMENTS

| | | | |
|---|---|---|---|
| 8,538,433 | B2 | 9/2013 | Kekki et al. |
| 9,125,208 | B2* | 9/2015 | Suzuki .............. H04W 52/0258 |
| 9,173,166 | B2* | 10/2015 | Al ........................ H04W 60/04 |
| 9,282,579 | B2* | 3/2016 | Majumdar ............ H04W 76/50 |
| 9,338,682 | B2* | 5/2016 | Cherian ................ H04W 60/02 |
| 9,883,378 | B2 | 1/2018 | Mildh et al. |
| 10,015,621 | B2* | 7/2018 | Kim ......................... H04W 4/70 |
| 10,448,297 | B2* | 10/2019 | Iwai ........................ H04W 8/02 |
| 10,750,568 | B2* | 8/2020 | Ryu ...................... H04W 76/28 |
| 2008/0008127 | A1 | 1/2008 | Choi et al. |
| 2008/0125043 | A1 | 5/2008 | Karmanenko et al. |
| 2010/0061332 | A1* | 3/2010 | Kim ...................... H04W 72/20 714/748 |
| 2010/0195621 | A1* | 8/2010 | Kekki ................... H04W 48/17 370/332 |
| 2011/0009119 | A1 | 1/2011 | Breuer et al. |
| 2011/0092236 | A1 | 4/2011 | Iwamura et al. |
| 2011/0096737 | A1 | 4/2011 | Venkatachalam et al. |
| 2011/0201354 | A1 | 8/2011 | Park et al. |
| 2012/0164979 | A1 | 6/2012 | Bachmann et al. |
| 2012/0252397 | A1* | 10/2012 | Kumar .................. H04W 48/16 455/404.1 |
| 2012/0307784 | A1* | 12/2012 | Heden ..................... H04L 47/14 370/329 |
| 2013/0208699 | A1* | 8/2013 | Hakkinen ............. H04W 76/38 370/331 |
| 2013/0260810 | A1* | 10/2013 | Rayavarapu .......... H04W 76/19 455/509 |
| 2014/0378125 | A1* | 12/2014 | Bromell ................ H04W 60/02 455/422.1 |
| 2015/0009816 | A1* | 1/2015 | Hsu ..................... H04W 52/0251 370/230.1 |
| 2015/0282082 | A1 | 10/2015 | Landais et al. |
| 2015/0289223 | A1* | 10/2015 | Brock ................... H04W 60/04 455/435.1 |
| 2016/0100362 | A1 | 4/2016 | Palanisamy et al. |
| 2016/0105865 | A1* | 4/2016 | Grayson ................. H04W 8/06 455/435.1 |
| 2016/0205625 | A1* | 7/2016 | Stojanovski ...... H04W 52/0212 370/311 |
| 2016/0295521 | A1* | 10/2016 | Grayson ................. H04W 4/02 |
| 2016/0309379 | A1* | 10/2016 | Pelletier ................ H04W 76/27 |
| 2017/0094711 | A1* | 3/2017 | Hu ..................... H04W 74/0833 |
| 2017/0223699 | A1 | 8/2017 | Yasukawa et al. |
| 2018/0115888 | A1 | 4/2018 | Mildh et al. |

FOREIGN PATENT DOCUMENTS

| | | |
|---|---|---|
| EP | 1765030 A1 | 3/2007 |
| EP | 2557889 A1 | 2/2013 |
| EP | 2757856 A1 | 7/2014 |
| EP | 2876948 A1 | 5/2015 |
| JP | 2010004503 A | 1/2010 |
| KR | 20110049622 A | 5/2011 |
| KR | 20160021188 A | 2/2016 |
| RU | 2010118515 A | 11/2011 |
| WO | 2009135438 A1 | 11/2009 |
| WO | 2009139675 A1 | 11/2009 |
| WO | 2013066531 A1 | 5/2013 |
| WO | 2013103010 A1 | 7/2013 |
| WO | 2013110543 A1 | 8/2013 |
| WO | 2013112021 A1 | 8/2013 |
| WO | 2015171984 A1 | 11/2015 |
| WO | 2016178605 A1 | 11/2016 |

OTHER PUBLICATIONS

Notice of Allowance and Examiner-Initiated Interview Summary for U.S. Appl. No. 14/758,634, dated Sep. 13, 2017, 21 pages.
Ericsson, "Tdoc R2-163998: Handling of inactive UEs," 3rd Generation Partnership Project (3GPP), TSG-RAN WG2 #94, May 23-27, 2016, 6 pages, Nanjing, P.R. China.
International Search Report and Written Opinion for International Patent Application No. PCT/SE2017/050537, dated Aug. 29, 2017, 16 pages.
Supplementary European Search Report for European Patent Application No. 15891336.8, dated Mar. 26, 2018, 3 pages.
Notice of Preliminary Rejection for Korean Patent Application No. 2017-7032806, dated Oct. 22, 2018, 8 pages.
First Office Action for Japanese Patent Application No. 2017-557208, dated Nov. 30, 2018, 8 pages.
Ericsson, "Tdoc R3-161290: Handling of UEs in RAN during periods of no traffic," 3rd Generation Partnership Project (3GPP), TSG-RAN WG3 #92, May 23-27, 2016, 4 pages, Nanjing, P.R. China.
Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.0.0, 3GPP Organizational Partners, Mar. 2013, 290 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.0.0, 3GPP Organizational Partners, Dec. 2013, 208 pages.
Author Unknon, "Technical Specification Group Radio Access Network; Evolved Universal Terrestrial Radio Access (E-UTRA); Radio Resource Control (RRC); Protocol specification (Release 12)," Technical Specification 36.331, Version 12.5.0, 3GPP Organizational Partners, Mar. 2015, 445 pages.
Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.1.0, 3GPP Organizational Partners, Mar. 2016, 551 pages.
Ipwireless Inc., "R2-121550: On Retaining RRC Context," 3rd Generation Partnership Project, TSG RAN WG2 Meeting #77b, Mar. 26-30, 2012, 7 pages, Jeju, Korea.
International Search Report and Written Opinion for International Patent Application No. PCT/SE2015/050497, dated Jan. 25, 2016, 15 pages.
Non-Final Office Action for U.S. Appl. No. 14/758,634, dated Apr. 10, 2017, 18 pages.
International Preliminary Report on Patentability for PCT/SE2015/050497, dated Jul. 21, 2017, 16 pages.
Nokia et al., "R2-167709: Considerations on NR Idle and RRC_Inactive," 3GPP TSG-RAN WG2 Meeting #96, Nov. 14-18, 2016, Reno, USA, 6 pages.
European Search Report for European Patent Application No. 19175675.8, dated Jul. 18, 2019, 6 pages.
Examination Report for European Patent Application No. 17726725.9, dated Jun. 25, 2019, 4 pages.
Notice of Preliminary Rejection for Korean Patent Application No. 2018-7019743, dated Sep. 3, 2019, 9 pages.

(56) References Cited

OTHER PUBLICATIONS

Office Action for Russian Patent Application No. 2018145039/08(075301), dated Sep. 6, 2019, 9 pages.
Examination Report for European Patent Application No. 15891336.8, dated Apr. 12, 2018, 6 pages.
Search Report for Japanese Patent Application No. 2017-557208, dated Nov. 21, 2018, 66 pages.
Non-Final Office Action for U.S. Appl. No. 15/840,187, dated Apr. 5, 2019, 21 pages.
Notice of Reasons for Refusal for Japanese Patent Application No. 2018-560829, dated Dec. 13, 2019, 4 pages.
Notice of Preliminary Rejection for Korean Patent Application No. 10-2018-7037096, dated Feb. 18, 2020, 12 pages.
Ericsson, "Tdoc R3-160845: Handling of inactive UEs," 3GPP TSG-RAN WG3 #91bis, Apr. 11-15, 2016, Bangalore, India, 4 pages.
Search Report for Japanese Patent Application No. 2019-056917, dated Nov. 8, 2019, 31 pages.
Examination Report for European Patent Application No. 19175675.8, dated Aug. 1, 2019, 8 pages.
Huawei, "R2-162310: Introduction of NB-IoT," 3rd Generation Partnership Project, TSG-RAN WG2 #93BIS, Change Request, Apr. 11-15, 2016, 291 pages, Dubrovnik, Croatia.
Notification of Reason for Refusal for Korean Patent Application No. 10-2018-7037096, dated Aug. 25, 2020, 13 pages.
First Office Action for Chinese Patent Application No. 201780044764.2, dated Mar. 10, 2021, 25 pages.
Notice of Reasons for Refusal for Japanese Patent Application No. 2020-122319, dated Dec. 3, 2021, 5 pages.
First Office Action for Chinese Patent Application No. 202111419368.8, dated Aug. 25, 2023, 17 pages.

* cited by examiner

STORAGE OF UE CONTEXTS IN RAN FOR INACTIVE UES

This application is a 35 U.S.C. § 371 national phase filing of International Application No. PCT/SE2017/050537, filed May 19, 2017, which claims the benefit of U.S. Provisional Application No. 62/339,518, filed May 20, 2016, the disclosures of which are incorporated herein by reference in their entireties.

TECHNICAL FIELD

The present disclosure relates to a cellular communications network and, in particular, to storage of User Equipment device (UE) contexts in a Radio Access Network (RAN) for inactive UEs.

BACKGROUND

PCT Patent Application Serial No. PCT/SE2015/050497, filed May 6, 2015 and published as WO 2016/178605 A1, which is hereby incorporated by reference in its entirety, introduced the concept of storing the User Equipment (UE) Radio Access Network (RAN) context in the UE and in the RAN when the UE is in a not connected state and then re-using the context when the UE returns to connected state.

In a typical wireless, cellular, or radio communications network, wireless devices, also known as mobile stations, terminals, and/or UEs, communicate via a RAN with one or more Core Networks (CNs). The RAN covers a geographical area which is divided into cells, with each cell being served by a base station, e.g. a Radio Base Station (RBS), or network node, which in some networks may also be called, for example, a "Node B" or an "enhanced or evolved Node B (eNB)." A cell is a geographical area where radio coverage is provided by the RBS at a base station site or an antenna site in case the antenna and the RBS are not collocated. One RBS may serve one or more cells.

A Universal Mobile Telecommunications System (UMTS) is a third generation mobile communication system, which evolved from Second Generation (2G) Global System for Mobile Communications (GSM). The UMTS Universal Terrestrial RAN (UTRAN) is essentially a RAN using Wideband Code Division Multiple Access (WCDMA) and/or High-Speed Packet Access (HSPA) to communicate with a UE. In a forum known as the Third Generation Partnership Project (3GPP), telecommunications suppliers propose and agree upon standards for third generation networks and UTRAN specifically, and investigate enhanced data rate and radio capacity. In some versions of the RAN, as e.g. in UMTS, several base stations may be connected, e.g. by landlines or microwave, to a controller node, such as a Radio Network Controller (RNC) or a Base Station Controller (BSC), which supervises and coordinates various activities of the plural base stations connected thereto. The RNCs are typically connected to one or more CNs.

Specifications for the Evolved Packet System (EPS) have been completed within 3GPP and this work continues in the coming 3GPP releases. The EPS comprises the Evolved UTRAN (E-UTRAN), also known as the Long Term Evolution (LTE) radio access, and the Evolved Packet Core (EPC), also known as the System Architecture Evolution (SAE) CN. E-UTRAN/LTE is a variant of a 3GPP radio access technology wherein the RBS nodes are directly connected to the EPC CN rather than to RNCs. In general, in E-UTRAN/LTE the functions of an RNC are distributed between the RBS nodes, e.g. eNBs in LTE, and the CN. As such, the RAN of an EPS has an essentially flat architecture comprising RBS nodes without reporting to RNCs.

FIG. 1 illustrates the current standard EPC architecture of a wireless communications network. The EPC architecture, including all of its components and interfaces, is further described and defined in 3GPP Technical Specification (TS) 23.401 V12.0.0. The current standard E-UTRAN architecture is further described and defined in, e.g., 3GPP TS 36.300 V12.0.0.

FIG. 2 illustrates the radio interface user and control plane protocol for E-UTRAN. The E-UTRAN radio interface user and control plane protocol consists of the following protocol layers and main functionalities.

Radio Resource Control (RRC) (Control Plane Only)

The main function for control plane: broadcast of system information for both Non-Access Stratum (NAS) and Access Stratum (AS); paging; RRC connection handling; allocation of temporary identifiers for the UE; configuration of signaling radio bearer(s) for RRC connection; handling of radio bearers; Quality of Service (QoS) management functions; security functions including key management; mobility functions (including UE measurement reporting and control of the reporting, handover, UE cell selection and reselection, and control of cell selection and reselection); and NAS direct message transfer to/from the UE.

Packet Data Convergence Protocol (PDCP)

There exists one PDCP entity for each radio bearer for the UE. PDCP is used for both control plane, i.e. RRC, and for user plane, i.e. user data received via General Packet Radio System (GPRS) Tunneling Protocol User Plane (GTP-U) signaling. The main function for the control plane is ciphering/deciphering and integrity protection. Main functions for the user plane are: ciphering/deciphering; header compression and decompression using Robust Header Compression (ROHC); and in-sequence delivery, duplicate detection, and retransmission.

Radio Link Control (RLC)

The RLC layer provides services for the PDCP layer and there exists one RLC entity for each radio bearer for the UE. Main functions for both the control and user plane are: segmentation/concatenation; retransmission handling; duplicate detection; and in-sequence delivery to higher layers.

Medium Access Control (MAC)

The MAC provides services to the RLC layer in the form of logical channels and performs mapping between these logical channels and transport channels. Main functions are: uplink and downlink scheduling, scheduling information reporting, Hybrid Automatic Repeat Request (HARQ) retransmissions, and multiplexing/de-multiplexing data across multiple component carriers for carrier aggregation.

Physical Layer (PHY)

The PHY provides services to the MAC layer in the form of transport channels and handles mapping of transport channels to physical channels.

Information relating to one or more of these protocol layers and their functionality is hereinafter referred to as RAN context information. In other words, the configuration of these protocol layers for a particular wireless device would be the RAN context information of this particular wireless device in the wireless communications network. The configuration of these protocol layers are typically done by the RRC layer via RRC configuration messages. One example of configuration specific information is different identifiers on the different protocol layers for the wireless device. However, it should also be noted that the RAN context information may further include additional information, such as, for example, radio access capabilities of the wireless device, previous mobility or traffic history of the wireless device, etc.

For instance, the RAN context information of a wireless device may comprise RRC protocol information of the wireless device. In some embodiments, the RAN context information may comprise one or more identifiers used for the wireless device in the wireless communications network. Examples of such identifiers may comprise a Cell Radio Network Temporary Identifier (C-RNTI), a SAE Temporary Mobile Subscriber Identity (S-TMSI), a Globally Unique Temporary Identity (GUTI), etc. In some embodiments, the RAN context information may comprise configuration parameters of the wireless device for a communications protocol on a lower layer than the RRC protocol layer. Examples of such configuration parameters may comprise RLC configuration parameters, e.g. RLC Acknowledged Mode (RLC-AM) or RLC Unacknowledged Mode (RLC-UM), or mapping parameters between Resource Blocks (RBs) and logical channels. In some embodiments, the RAN context information may comprise radio access capability information of the wireless device. Examples of such radio access capabilities may comprise some or all of the capabilities defined in the standard 3GPP 36.331, "UE-EUTRA-Capability," such as, e.g., which release the wireless device supports, which wireless device category the wireless device belongs to, and which frequency bands and Radio Access Technologies (RATs) the wireless device supports. In some embodiments, the RAN context information may comprise information related to one or more ongoing radio bearers of the wireless device. In some embodiments, the RAN context information may comprise one or more security keys and/or sequence numbers associated with the wireless device. Examples of such security keys may be an eNB Key (KeNB), a KRRCint (i.e., the Security Key used for integrity protection of RRC messages), a KRRCenc (i.e., the Security Key used for encryption of RRC messages), a KUPenc (i.e., the Security Key used for encryption of user plane data), etc. Examples of such sequence numbers may be a PDCP sequence number, a COUNT number, etc.

The above described functionality of the network node (eNB) may be deployed in different ways. In one example, all the protocol layers and related functionality is deployed in the same physical node including the antenna. One example of this is a so-called pico or femto eNB. Another example is a so-called Main-Remote split. In this case, the eNB is divided into a main unit and a remote unit. The main unit may also be referred to as a Digital Unit (DU) and the remote unit may also be referred to as a Remote Radio Unit (RRU). In this case, the main unit comprises all the protocol layers except the lower parts of the PHY that are instead placed in the remote unit. In a further example, the remote unit and the antenna are co-located. This may be referred to as an Antenna Integrated Radio (AIR) system.

Handling of Inactive UEs in the RAN

In the contribution R3-161290 to the 3GPP RAN 3 WG meeting in May 2016 there is a proposal to introduce a RAN controlled inactive state where the CN/RAN connection is maintained as described below. The RAN-controlled inactive state (which is also referred to herein as a RAN-based inactive state) is to be distinguished from the conventional IDLE state in which the UE is only known at the CN level and does not have a context in the RAN. The RAN controlled inactive state is also referred to herein as a RAN based inactive state.

It has been proposed that UEs in the RAN controlled inactive state should incur minimum signaling and resource costs in the RAN/CN making it possible to maximize the number of UEs utilizing, and benefiting from, this state. It has also been proposed that UEs in the RAN controlled inactive state perform mobility within an area without notifying the network. It has also been proposed that the RAN can trigger paging of UEs which are in the RAN controlled inactive state.

If a RAN controlled inactive mode is supported, this means that the transition from inactive to active state in the RAN will be transparent to the CN.

In the downlink this means, for the default solution, that downlink packets will be sent to the last node where the UE was connected (anchor RAN node). That node will then be responsible for initiated UE paging within the paging area that the UE is allowed to move in without notifying the network.

In the uplink it means that the UE needs to perform a RAN level procedure to transition to active state to transmit data. In case the UE has moved to a different RAN node this RAN node will most likely need to fetch the UE context from another RAN node, and if needed notify the CN that the UE has moved to a new node.

If the UE moves outside the paging area it would need to notify the network about the mobility so that the paging area can be updated. This procedure could trigger a RAN node relocation or the RAN node can be kept.

The following RAN functions are envisioned:

Paging for downlink data

Context fetch to handle moving UEs (may be similar to an existing LTE procedure)

Mobility updating (it is possible this could use a similar mechanism as context fetch)

In order for these mechanisms to be enabled, the UE needs to be allocated a RAN identifier uniquely identifying the UE context in the RAN.

In case there is any failure where it is not possible to retrieve the UE RAN context, it is assumed that the RAN context can be rebuilt as it would happen in the case of a new connection setup.

FIGS. 3 and 4 illustrate the basic principles.

SUMMARY

Systems and methods are disclosed herein that relate configuration of a periodic updating timer for, e.g., a Radio Access Network (RAN)-controlled inactive state. In some embodiments, a method of operation of a RAN node in a cellular communications network comprises configuring a User Equipment (UE) with a timer value T for a periodic updating timer. In this manner, the RAN node is able to configure the UE with a time value T, e.g., for use by the UE for providing periodic update messages while the UE is operating in an inactive state such as, e.g., a RAN-controlled inactive state.

In some embodiments, the timer value T is a function of whether the RAN node can reliably store a RAN context of the UE. In some embodiments, the timer value T is a function of one or more characteristics of the RAN node. In some embodiments, the timer value T is received from another network node. In some embodiments, the periodic updating timer is a timer utilized by the UE for periodic updates when the UE is in a RAN inactive state. In some embodiments, the timer value T is a first value if the RAN node is a macro node and a second value if the RAN node is a Low Power Node (LPN), the second value being less than the first value.

In some embodiments, configuring the UE with the timer value T comprises configuring the UE with the timer value T prior to releasing the UE. In other embodiments, configuring the UE with the timer value T comprises configuring the UE with the timer value T upon releasing the UE.

In some embodiments, configuring the UE with the timer value T comprises sending a release message to the UE, wherein the release message comprises the timer value T.

In some embodiments, the method further comprises releasing a connection with the UE and, after releasing the connection with the UE, receiving an update message from the UE upon expiry of the periodic updating timer.

Embodiments of a RAN node for a cellular communications network are also disclosed. In some embodiments, a RAN node for a cellular communications network is adapted to configure a UE with a timer value T for a periodic updating timer. Further, in some embodiments, the RAN node is further adapted to perform the method of operation of a RAN node according to any one of the embodiments disclosed herein.

In some embodiments, a RAN node for a cellular communications network comprises one or more transmitters, one or more processors, and memory storing instructions executable by the one or more processors whereby the RAN node is operable to configure a UE with a timer value T for a periodic updating timer. Further, in some embodiments, by execution of the instructions by the one or more processors, the RAN node is further operable to perform the method of operation of a RAN node according to any one of the embodiments disclosed herein.

In some embodiments, a RAN node for a cellular communications network comprises a timer configuration module operable to configure a UE with a timer value T for a periodic updating timer.

Embodiments of a computer program comprising instructions which, when executed on at least one processor, cause the at least one processor to carry out the method of operation of a RAN node according to any one of the embodiments disclosed herein. Embodiments of a carrier containing the aforementioned computer program are also disclosed, wherein the carrier is one of an electronic signal, an optical signal, a radio signal, or a computer readable storage medium.

Embodiments of a method of operation of a UE in a cellular communications network are also disclosed. In some embodiments, a method of operation of a UE in a cellular communications network comprises receiving, from a RAN node, a configuration of a timer value T for a periodic updating timer. The method further comprises starting the periodic updating timer once a connection between the UE and the RAN node is released, and sending a periodic update message to the RAN node upon expiry of the periodic updating timer.

In some embodiments, the method further comprises storing a RAN context of the UE at the UE when in the RAN-controlled inactive state. In some embodiments, the method further comprises, upon transitioning from the RAN-controlled inactive state to an active state, rebuilding the RAN context of the UE if needed.

In some embodiments, the timer value T is a function of whether the RAN node can reliably store a RAN context of the UE. In some embodiments, the timer value T is a function of one or more characteristics of the RAN node.

In some embodiments, receiving the configuration of the timer value T for the periodic updating timer comprises receiving the configuration of the timer value T for the periodic updating timer prior to release of the connection between the UE and the RAN node. In some other embodiments, receiving the configuration of the timer value T for the periodic updating timer comprises receiving the configuration of the timer value T for the periodic updating timer upon release of the connection between the UE and the RAN node. In some embodiments, receiving the configuration of the timer value T for the periodic updating timer comprises receiving a release message from the RAN, where the release message comprises the timer value T for the periodic updating timer.

Embodiments of a UE for a cellular communications network are also disclosed. In some embodiments, a UE for a cellular communications network is adapted to receive, from a RAN node, a configuration of a timer value T for a periodic updating timer. The UE is further adapted to start the periodic updating timer once a connection between the UE and the RAN node is released and send a periodic update message to the RAN node upon expiry of the periodic updating timer. In some embodiments, the UE node is further adapted to perform the method of operation of a UE according to any one of the embodiments disclosed herein.

In some embodiments, a UE for a cellular communications network comprises one or more transmitters, one or more receivers, one or more processors, and memory storing instructions executable by the one or more processors whereby the UE is operable to receive, from a RAN node, a configuration of a timer value T for a periodic updating timer, start the periodic updating timer once a connection between the UE and the RAN node is released, and send a periodic update message to the RAN node upon expiry of the periodic updating timer. In some embodiments, by execution of the instructions by the one or more processors, the UE is further operable to perform the method of operation of a UE according to any one of the embodiments disclosed herein.

In some embodiments, a UE for a cellular communications network comprises a receiving module, a timer starting module, and a sending module. The receiving module is operable to receive, from a RAN node, a configuration of a timer value T for a periodic updating timer. The timer starting module is operable to, once a connection between the UE and the RAN node is released, start the periodic updating timer. The sending module is operable to, upon expiry of the periodic updating timer, send a periodic update message to the RAN node.

Embodiments of a computer program comprising instructions which, when executed on at least one processor, cause the at least one processor to carry out the method of operation of a UE according to any one of the embodiments disclosed herein. Embodiments of a carrier containing the aforementioned computer program are also disclosed, wherein the carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
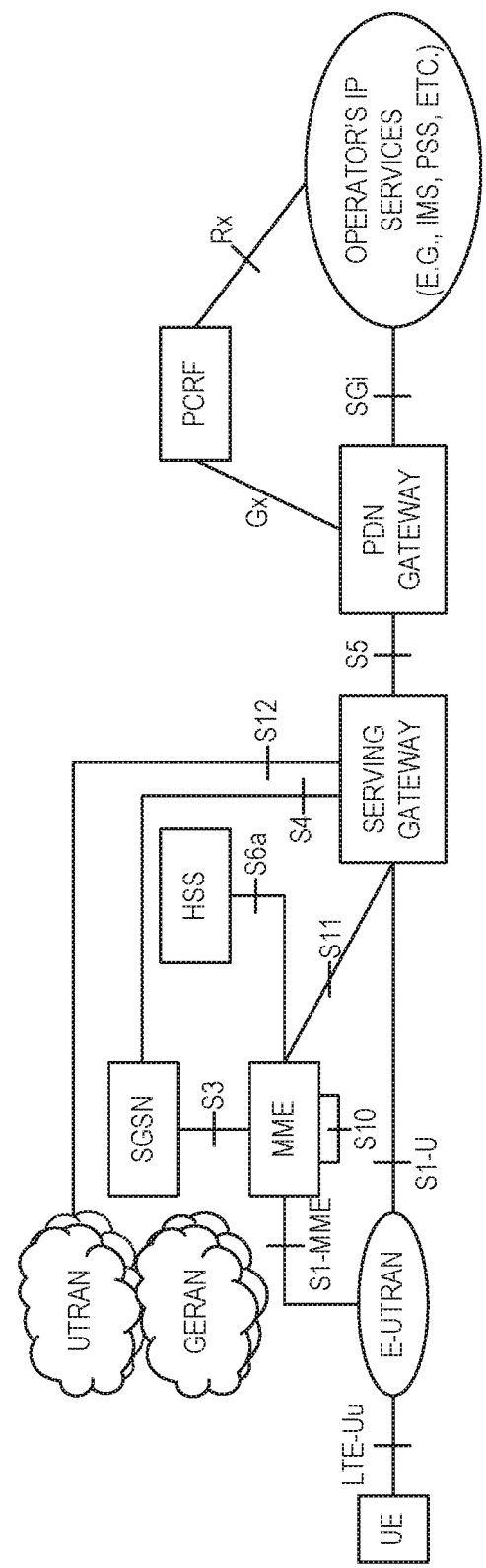
FIG. 1 illustrates the current standard Evolved Packet Core (EPC) architecture of a wireless communications network.
Figure 2:
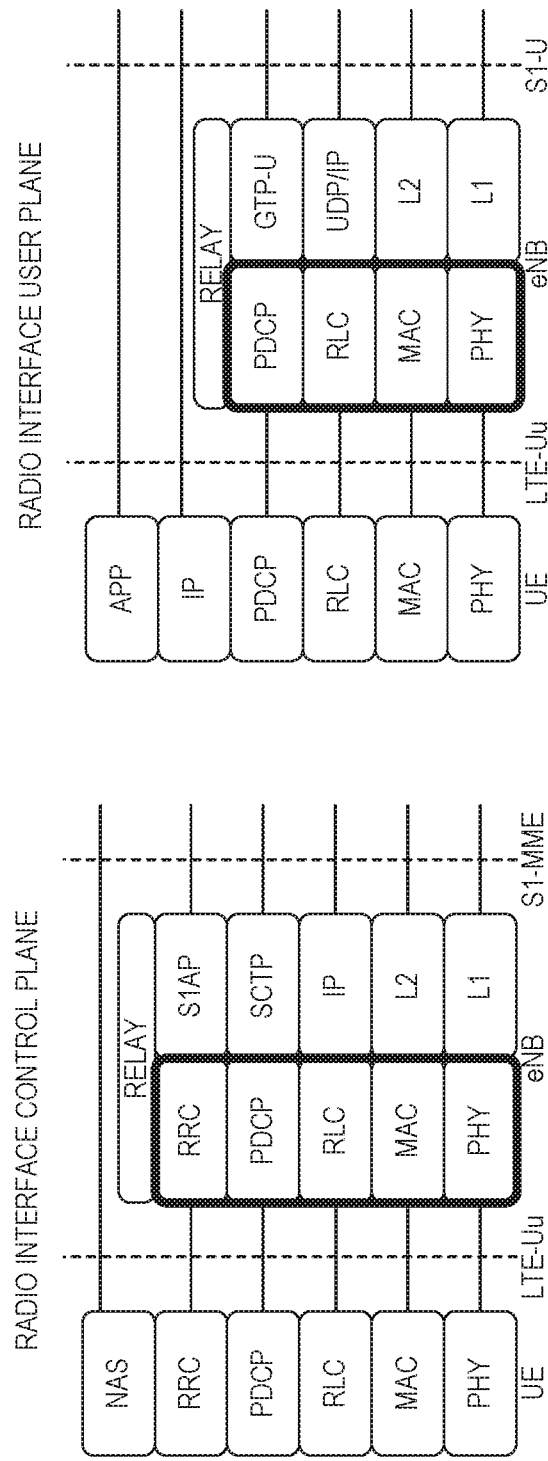
FIG. 2 illustrates the radio interface user and control plane protocol for Evolved Universal Terrestrial Radio Access Network (E-UTRAN)
Figure 3:
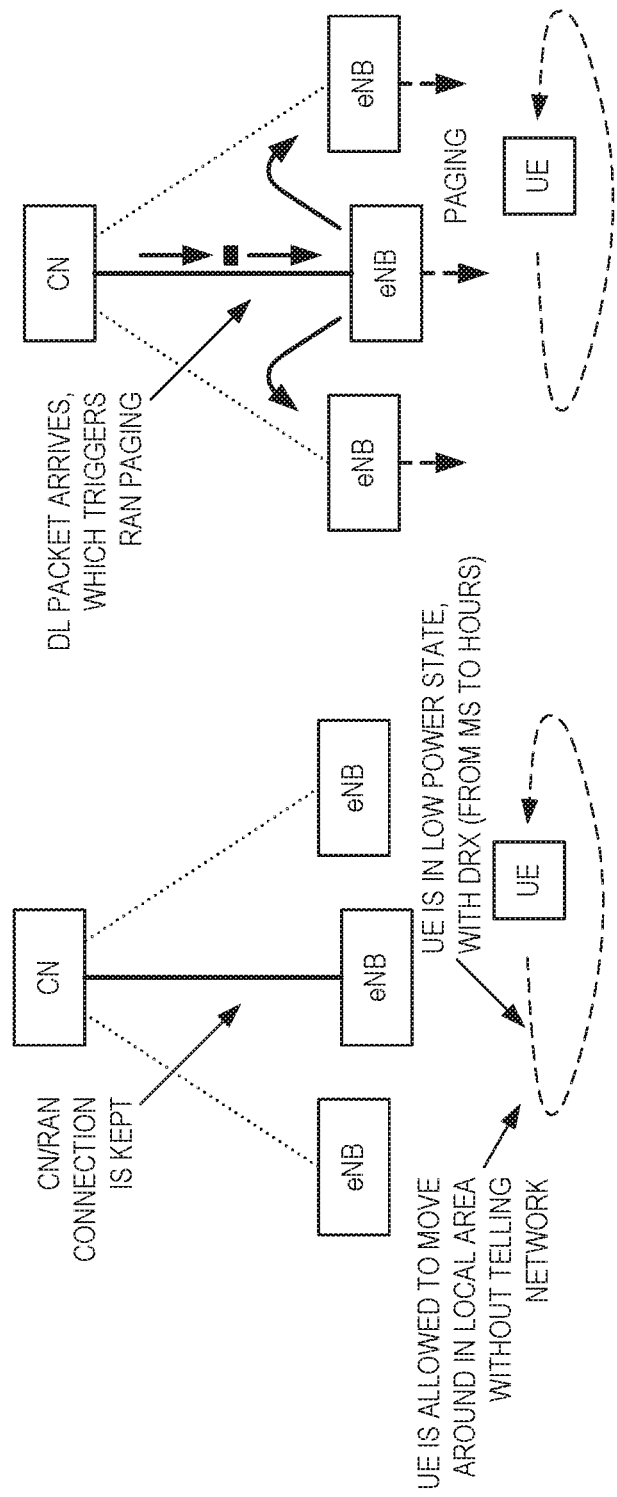
FIGS. 3 and 4 illustrate the basic principles of handling of inactive User Equipment devices (UEs) in the Radio Access Network (RAN)
Figure 4:
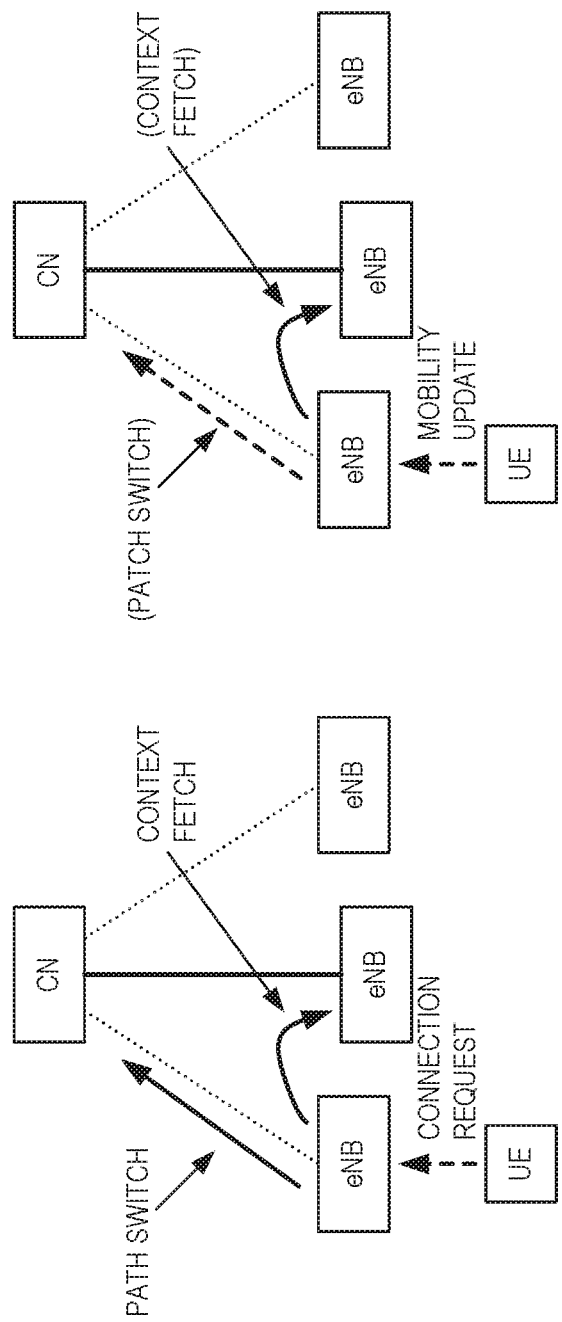

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node:

As used herein, a "radio node" is either a radio access node or a wireless device.

Radio Access Node:

As used herein, a "radio access node" is any node in a Radio Access Network (RAN) of a cellular communications network that operates to wirelessly transmit and/or receive signals. The terms "radio access node" and "RAN node" are used interchangeably herein. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Macro Node:

As used herein, a "macro node" is one type of radio access node. A macro node may also be referred to as a high power node. One example of a macro node is a LTE eNB.

Low Power Node (LPN):

As used herein, a "low power node (LPN)" is one type of radio access node and is to be distinguished from a macro node. In general, a LPN has a lower transmit power than a macro node and, as such, has a smaller coverage area than a macro node. Some examples of a LPN include a micro base station, a pico base station, a home eNB, or the like.

Core Network (CN) Node:

As used herein, a "core network (CN) node" is any type of node in a CN. Some examples of a CN node include, e.g., a Mobility Management Entity (MME), a Packet Data Network (PDN) Gateway (P-GW), a Service Capability Exposure Function (SCEF), or the like.

Wireless Device:

As used herein, a "wireless device" is any type of device that has access to (i.e., is served by) a cellular communications network by wirelessly transmitting and/or receiving signals to a radio access node(s). The terms "wireless device" and "User Equipment (UE)" are used interchangeably herein in that the term "UE" is used in a broad sense to mean any type of wireless device unless otherwise specified (e.g., unless specified as an LTE UE). Some examples of a wireless device include, but are not limited to, an UE in a 3GPP network and a Machine Type Communication (MTC) device.

Network Node:

As used herein, a "network node" is any node that is either part of the RAN or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Storing the UE RAN context in the RAN for UEs that are not connected or inactive introduces a potential risk that the UE RAN context is lost, e.g., due to restart of the RAN node. A similar problem can also occur if the UE context is stored in the CN, but most likely the risk of losing the UE context is deemed lower in those cases since typically CN nodes are deployed in a secure central environment and use additional redundancy methods. Some RAN nodes on the other hand such as pico or femto base stations may be deployed everywhere in a non-controlled environment including coffee shops, enterprises, shopping malls, etc. These nodes may in some cases also need to be low-cost, meaning additional costly redundancy methods may not be used.

Losing the UE RAN context may lead to the UE not being reachable for incoming data, paging, or services during a time period. The time period depends on the UE's own activity and on any periodic location updating signaling from the UE. It is assumed that once the UE contacts the network the UE RAN context will be re-built in some way or another.

In a legacy system, the periodic location updating timers, which are used by the core network, are set to longer than one hour in order to have a good tradeoff between the risk of not being able to reach the UE if the context is lost and the amount of the signaling in the network. However, the current solution is not good enough given that UE RAN context may be lost more frequently if it is stored in more unreliable nodes.

One way to minimize the risk of UEs ending up in an unreachable state could be as in the 3GPP Release 13 Radio Resource Control (RRC) suspend/resume solution where CN based paging and registration updating is also supported. In such a solution, if the RAN context is lost, the CN can still page and reach the UE. The drawback with this solution though is that if it is desirable to support RAN paging in order to optimize the paging performance in RAN, the UE would then still need to also monitor CN based paging in case the RAN context is lost. This extra complexity in the UE and network is a fairly high price to pay for something that happens quite rarely.

The present disclosure introduces methods for handling UE context in the RAN in such a way that the risk of the UE ending up in an unreachable state is minimized. The following high level embodiments are envisioned:

The usage of a configurable periodic updating timer in the UE, used in such a way that RAN nodes which are considered more unreliable (e.g., pico or femto nodes) assign the UE a short periodic updating timer in the inactive state, where RAN nodes which are considered highly reliable use a long timer. In this way the total amount of periodic updating is not affected so much, but the risk of UEs ending up in an unreachable state is minimized.

The possibility to move the UE context from an unreliable RAN node (e.g., pico or femto nodes) to a more reliable RAN node when the UE is sent to the inactive state by such an unreliable RAN node. This can be done when the RAN decides to order the UE to inactive state. It first transfers the UE RAN context to a more reliable RAN node towards which it has an interface and then provides the UE with a context identifier which is associated with that more reliable RAN node.

For solutions where the RAN based inactive state (including RAN paging) is only used for UEs which have a context stored in a reliable RAN node, UEs in non-reliable RAN nodes are only supported in a CN based sleep state with CN paging. In this solution the UE would only need to monitor one type of paging.

By using embodiments disclosed herein, it is possible to reduce the risk of UEs ending up in an unreachable state which is beneficial for both the operator and the end user. It also avoids the need for CN paging in addition to RAN paging which introduces a lot of extra complexity.

Figure 5:
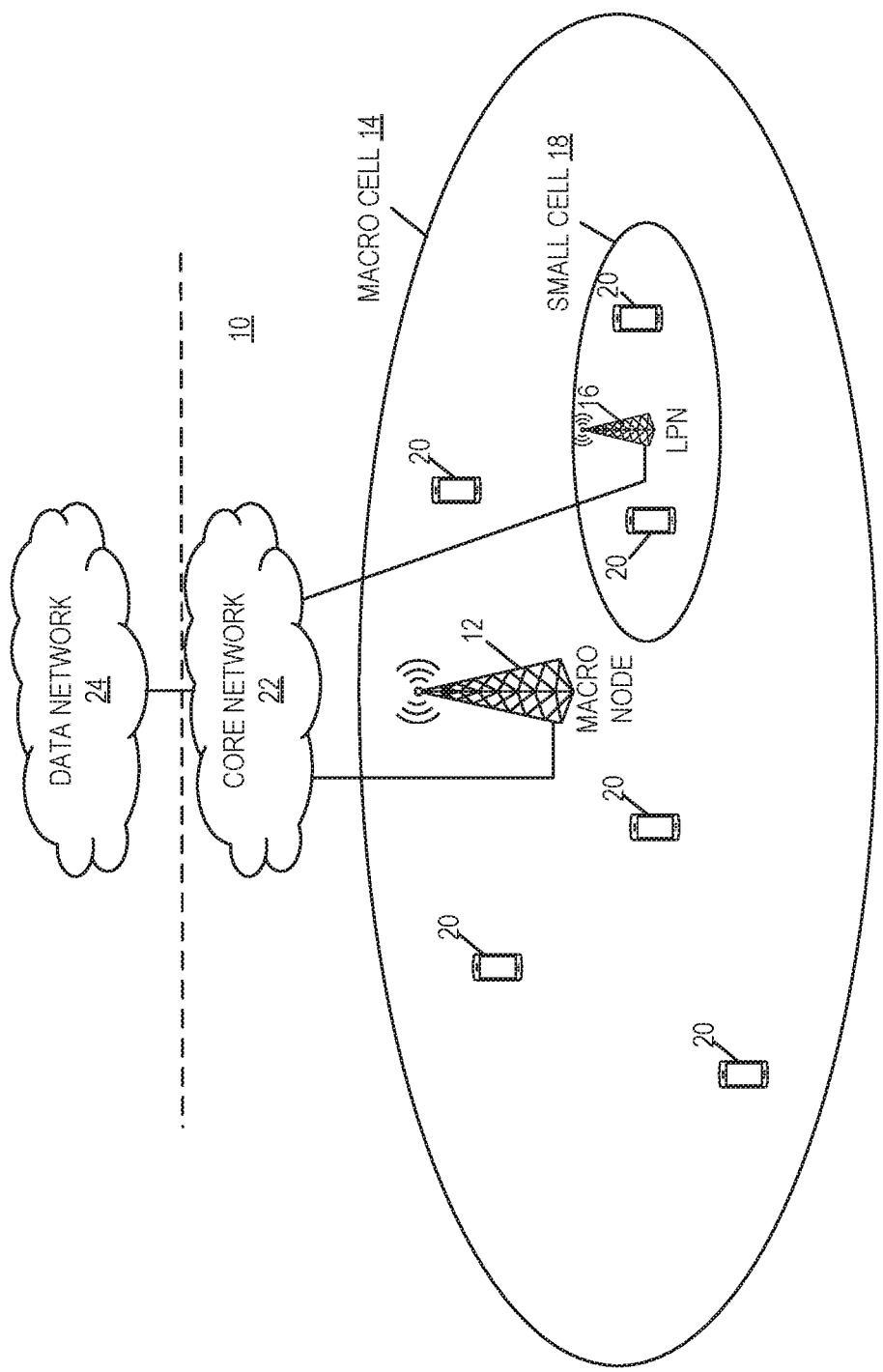
FIG. 5 illustrates one example of a cellular communications network in which embodiments of the present disclosure may be implemented.

In this regard, FIG. 5 illustrates one example of a cellular communications network 10 in which embodiments of the present disclosure may be implemented. As illustrated, the cellular communications network 10 includes a RAN. The RAN includes, in this example, a macro node 12 that serves a macro cell 14 and a LPN 16 that serves a small cell 18. UEs 20 transmit and receive wireless signals to and from the macro node 12 and/or the LPN 16. In this context of the embodiments described herein, the macro node 12 is one example of a radio access node or base station that is reliable in the sense that a RAN context of a UE 20 may be stored reliably at the macro node 12. Conversely, in this example, the LPN 16 is one example of a radio access node or base station that is unreliable in the sense that a RAN context of a UE 20 may not be reliably stored at the LPN 16. However, this is only an example.

The macro node 12 and the LPN 16 are connected to a core network 22 via corresponding CN interfaces (e.g., S1 interfaces), which may be wired or wireless interfaces. While not illustrated, the macro node 12 and the LPN 16 may be connected to one another via base-station-to-base-station interfaces (e.g., X2 interfaces), which may be wired or wireless interfaces. The core network 22 is connected to a data network 24 via an appropriate interface(s).

Figure 6:
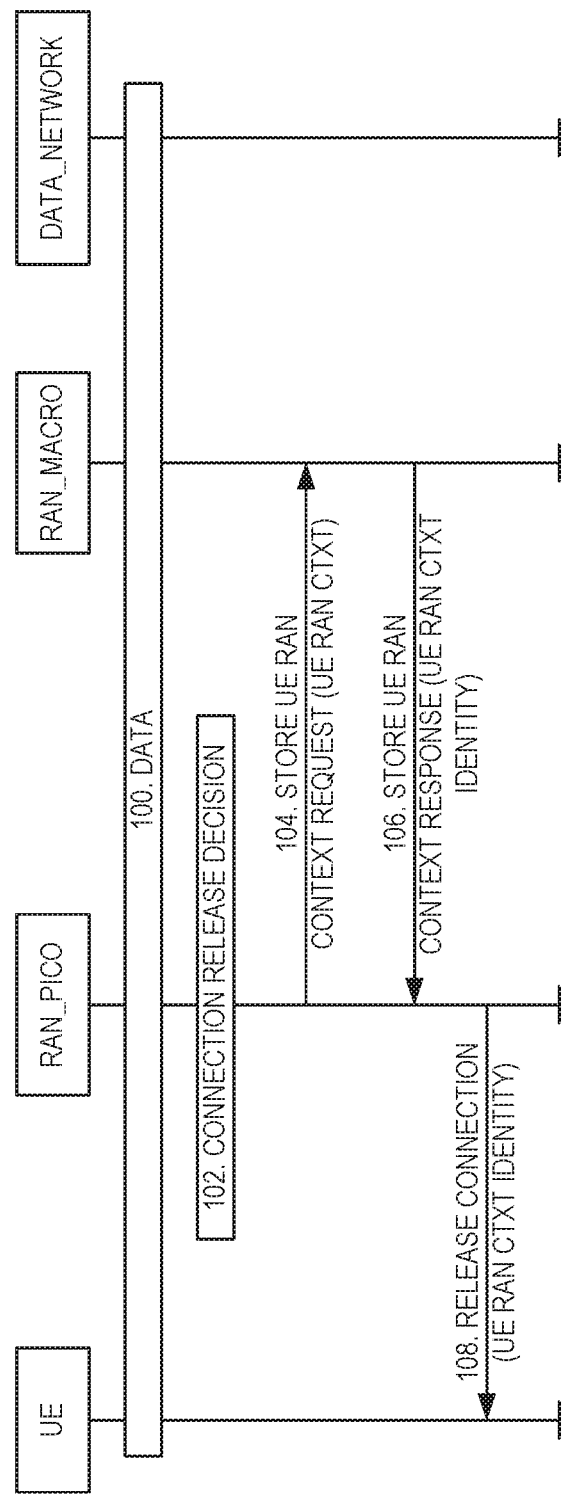
FIG. 6 illustrates UE RAN context storing according to some embodiments of the present disclosure.

FIG. 6 illustrates UE RAN context storing according to some embodiments of the present disclosure. In particular, FIG. 6 shows how a UE RAN context of a UE (e.g., one of the UEs 20 of FIG. 5) is stored in a reliable macro RAN node (e.g., the macro node 12 of FIG. 5) designated as RAN_Macro by an unreliable pico RAN node (e.g., the LPN 16 of FIG. 5) designated as RAN_Pico according to some embodiments of the present disclosure. Note that while a pico RAN node is used in this example, the process is equally applicable to a more general LPN or even more generally to any other type of radio access node (i.e., any other type of RAN node) that is unable to reliably store UE RAN context information. For example, a RAN node may be unable to reliably store UE RAN context information due to various issues such as, for example, memory shortage.

As illustrated, the process of FIG. 6 is as follows:

Step 100: A data connection is established between the UE and the Data_Network (e.g., the data network 24 of FIG. 5) whereby the UE has an active connection with the RAN_Pico.

Step 102: Due to, e.g., inactivity, the RAN_Pico node decides to release the connection with the UE, e.g. to move it to an inactive state (e.g., a RAN controlled inactive state).

Step 104: The RAN_Pico node sends, over an interface that supports a UE RAN context storing procedure, a request to the RAN_Macro node for storing of the UE RAN context. The request includes the UE RAN context of the UE.

Step 106: The RAN_Macro node stores the UE RAN context of the UE and replies with a response message containing a UE RAN context identity allocated to the UE RAN context of the UE on that RAN_Macro node.

Step 108: The RAN_Pico node releases the connection with the UE, e.g. by moving the UE into an inactive state (e.g., a RAN controlled inactive state). It provides the UE with the UE RAN context identity provided by the RAN_Macro node in step 106.

Figure 7:
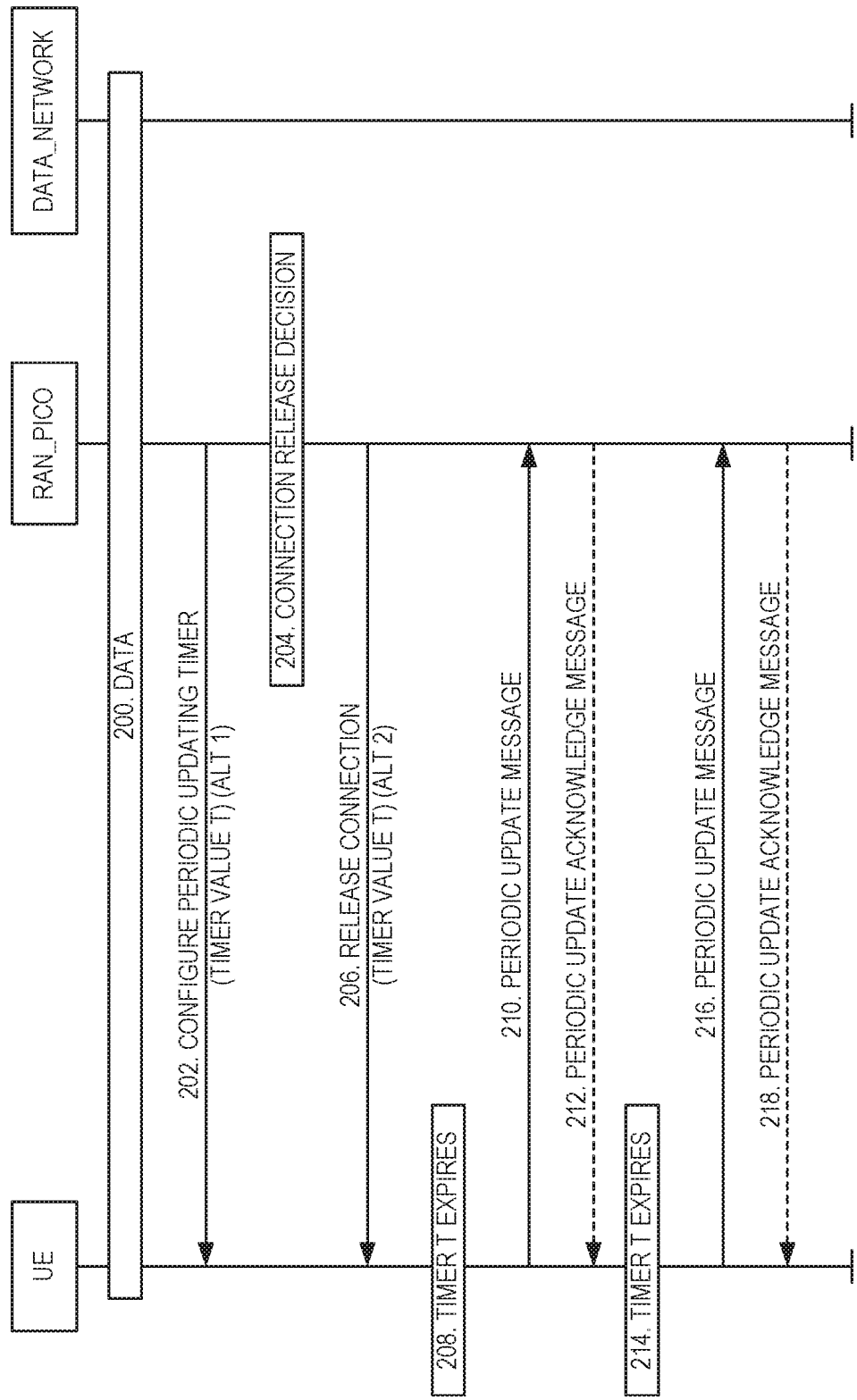
FIG. 7 illustrates RAN configuration of a periodic update timer according to some embodiments of the present disclosure.

FIG. 7 illustrates RAN configuration of a periodic update timer according to some embodiments of the present disclosure. In particular, FIG. 7 shows how the RAN node (in this example RAN_Pico but can also be some other RAN node) configures a timer value T for a periodic updating timer of the UE. Again, here the RAN_Pico may be, e.g., the LPN 16 of FIG. 5) and the UE may be one of the UEs 20 of FIG. 5. The process is as follows:

Step 200: A data connection is established between the UE and the Data_Network (e.g., the data network 24 of FIG. 5) whereby the UE has an active connection with the RAN_Pico node.

Step 202: In some embodiments (i.e., in a first alternative), the RAN_Pico node configures the periodic updating timer to a timer value T before connection release. Since in this example the RAN_Pico node is considered unreliable with respect to storing UE RAN context, the timer value T is smaller than a respective timer value T for a reliable RAN node (e.g., the macro node 12). For example, the timer value T configured by the RAN_Pico node may be on the order of seconds or minutes, rather than on the order of hours.

Step 204: Due to, e.g., inactivity, the RAN_Pico node decides to release the connection with the UE, e.g. to move it to an inactive state (e.g., move it to a RAN controlled inactive state). Note that while the term "release" is used herein, other terms may be used such as, e.g., "suspend," "putting the UE in the RAN controlled inactive state," or the like.

Step 206: The RAN_Pico node releases the connection with the UE, e.g. by moving the UE into an inactive state (e.g., a RAN controlled inactive state). In a second alternative, the RAN_Pico node configures the timer value T when releasing the connection (e.g., the timer value T is included in the release message). Thus, in some embodiments, the timer value T is set in step 202, whereas in other embodiments the timer value T is set in step 206 when releasing the connection.

Step 208: Once the connection is released (and the UE has therefore entered the RAN-based inactive state), the UE starts the periodic updating timer set to the timer value T. The timer continues to run until it expires. The UE stores the RAN context of the UE while in the RAN-based inactive state. The stored RAN context is used by the UE when transitioning back to the RAN-based active state. In other words, the UE stores the RAN context of the UE when no longer in a (RAN based) connected state in the cell. This means that instead of discarding this information, the UE may save or cache this information in case of returning to the cell.

Step 210: Upon expiry of the timer (assuming the UE has not performed any other action during the time that requires signaling towards the network), the UE sends a periodic update message.

Step 212: Optionally, the network (e.g., the RAN_Pico node) may return an acknowledge message.

Step 214: If the UE has no data to send or receive, the UE resets the timer to the timer value T and re-enters the inactive state until the timer expires again. Once reset, the timer continues to run until it expires.

Step 216: Upon expiry of the timer (assuming the UE has not performed any other action during the time), the UE sends a periodic update message.

Step 218: Optionally, the network (e.g., the RAN_Pico node) may return an acknowledge message.

The process continues in this manner.

Note that, in some embodiments, the timer value T is a function of where the RAN node can reliably store RAN context of the UE (e.g., as determined based on one or more characteristics of the RAN node such as, e.g., a type or class of the RAN node, memory usage at the RAN node, or the like or otherwise determined). In some other embodiments, the timer value T is a function of one or more characteristics of the RAN node (e.g., type or class of the RAN node, amount of memory, memory usage, or the like). In some embodiments, the timer value T is determined or set by the RAN node itself. However, in other embodiments, the timer value T is determined or set by, e.g., some other node in the network (e.g., an Operations and Management (OAM) system) and sent to the RAN node.

Figure 8:
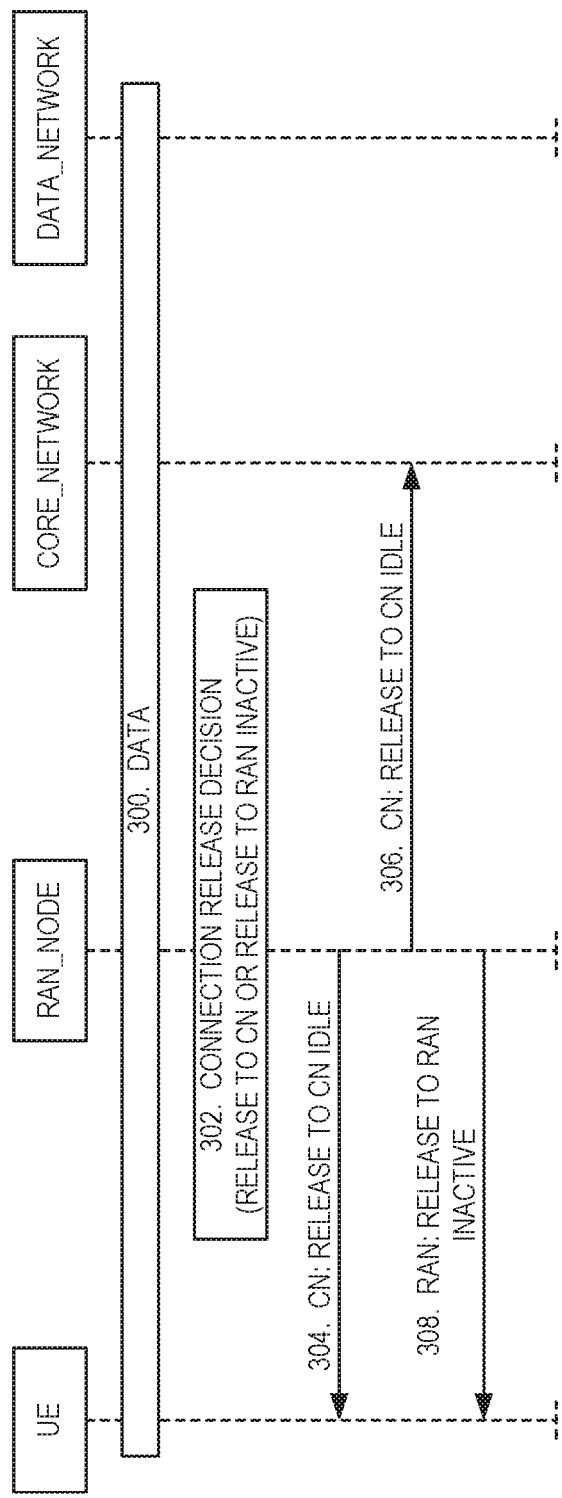
FIG. 8 illustrates a RAN node making a decision as to whether to retain UE RAN context of a UE according to some embodiments of the present disclosure.

FIG. 8 illustrates a RAN node making a decision as to whether to retain UE RAN context of a UE according to some embodiments of the present disclosure. In particular, FIG. 8 shows how the RAN node (e.g., the macro node 12 or the LPN 16 of FIG. 5) takes a decision to release a UE to an inactive state. The decision could either be to release the UE to a CN IDLE state with no RAN context stored in the RAN or to a RAN inactive state where the RAN context of the UE is stored and UE kept in a CN CONNECTED state. The decision is based on, among other things, the reliability of the context storage in the RAN node (which could be the reliability of the whole node). The process is as follows:

Step 300: A data connection is established between the UE and the Data_Network (e.g., the data network 24 of FIG. 5) whereby the UE has an active connection with the RAN_Node.

Step 302: Due to, e.g., inactivity, the RAN_Node decides to release the connection with the UE, e.g. to move it to an inactive state. The RAN_Node decides whether to release the UE to a CN IDLE state with no RAN context stored in the RAN or to a RAN inactive state where the RAN context of the UE is stored and kept in a CN CONNECTED state.

Steps 304 and 306: If the RAN_Node decides to release the UE to the CN IDLE state, it signals both the UE (step 304) and the Core_Network (step 306) to release the UE to the CN IDLE state. As noted above, the RAN context of the UE is not stored in the RAN in this case.

Step 308: If the RAN_Node decides to release the UE to RAN inactive state, the RAN_Node signals the UE to release the UE to the RAN inactive state. In this case, the RAN context of the UE is stored in the RAN. The RAN context may be stored at the RAN_Node in the conventional manner or stored at another RAN node (e.g., a more reliable RAN node as described above).

Figure 9:
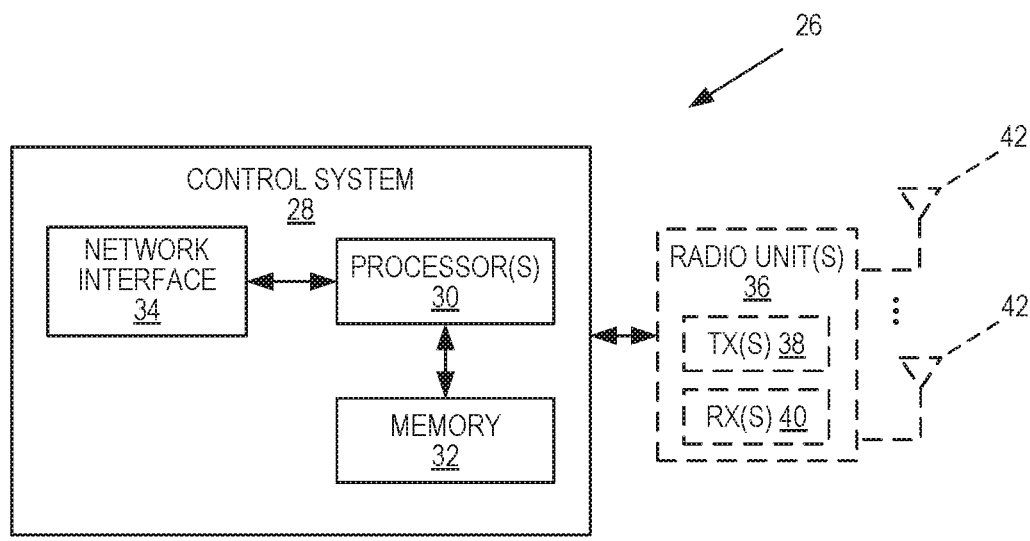
FIGS. 9 to 11 illustrate example embodiments of a network node.

FIG. 9 is a schematic block diagram of a network node 26 according to some embodiments of the present disclosure. The network node 26 may be, for example, a RAN node such as the macro node 12 or the LPN 16 of FIG. 5. As illustrated, the network node 26 includes a control system 28 that includes processing circuitry that includes one or more processors 30 (e.g., Central Processing Units (CPUs), Application Specific Integrated Circuits (ASICs), Field Programmable Gate Arrays (FPGAs), and/or the like). The control system 28 further includes memory 32, and a network interface 34. In addition, if the network node 26 is a RAN node, then the network node 26 also includes one or more radio units 36 that each includes one or more transmitters 38 and one or more receivers 40 coupled to one or more antennas 42. In some embodiments, the radio unit(s) 36 is external to the control system 28 and connected to the control system 28 via, e.g., a wired connection. However, in some other embodiments, the radio unit(s) 36 and potentially the antenna(s) 42 are integrated together with the control system 28. The one or more processors 30 operate to provide one or more functions of a network node as described herein. In some embodiments, the function(s) are implemented in software that is stored, e.g., in the memory 32 and executed by the one or more processors 30.

Figure 10:
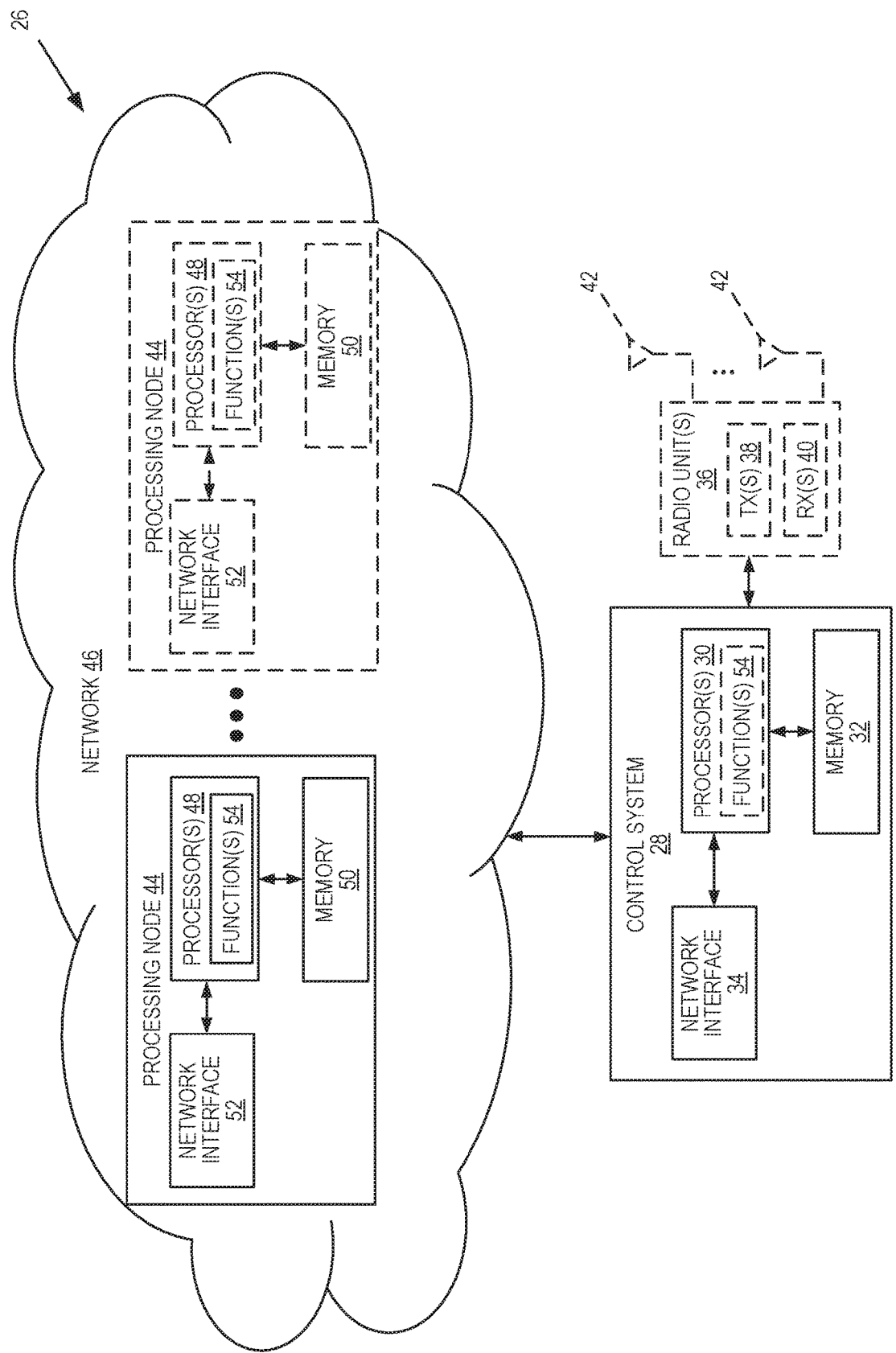

FIG. 10 is a schematic block diagram that illustrates a virtualized embodiment of the network node 26 according to some embodiments of the present disclosure. This discussion is equally applicable to other types of radio access nodes. Further, other types of network nodes may have similar virtualized architectures.

As used herein, a "virtualized" network node (e.g., a virtualized base station or a virtualized radio access node) is an implementation of the network node in which at least a portion of the functionality of the network is implemented as a virtual component (e.g., via a virtual machine(s) executing on a physical processing node(s) in a network(s)). As illustrated, in this example, the network node 26 includes the control system 28 that includes the one or more processors 30 (e.g., CPUs, ASICs, FPGAs, and/or the like), the memory 32, and the network interface 34 and, depending on the type of network node, the one or more radio units 36 that each includes the one or more transmitters 38 and the one or more receivers 40 coupled to the one or more antennas 42, as described above. The control system 28 is connected to the radio unit(s) 36 via, for example, an optical cable or the like. The control system 28 is connected to one or more processing nodes 44 coupled to or included as part of a network(s) 46 via the network interface 34. Each processing node 44 includes processing circuitry that includes one or more processors 48 (e.g., CPUs, ASICs, FPGAs, and/or the like), memory 50, and a network interface 52.

In this example, functions 54 of the network node (e.g., functions of the macro node 12 (RAN_Macro node) or the LPN 16 (e.g., the RAN_Pico node) or the functions of the RAN_Node) described herein are implemented at the one or more processing nodes 44 or distributed across the control system 28 and the one or more processing nodes 44 in any desired manner. The functions 54 may include, e.g., one or more functions 54 performed by the RAN_Pico node described with respect to FIG. 6, one or more functions 54 performed by the RAN_Pico node of FIG. 7, and/or one or more functions 54 performed by the RAN_Node of FIG. 8. In some particular embodiments, some or all of the functions 54 of the network node 26 described herein are implemented as virtual components executed by one or more virtual machines implemented in a virtual environment(s) hosted by the processing node(s) 44. As will be appreciated by one of ordinary skill in the art, additional signaling or communication between the processing node(s) 44 and the control system 28 is used in order to carry out at least some of the desired functions 54. Notably, in some embodiments, the control system 28 may not be included, in which case the radio unit(s) 36 communicate directly with the processing node(s) 44 via an appropriate network interface(s).

In some embodiments, a computer program including instructions which, when executed by at least one processor, causes the at least one processor to carry out the functionality of a network node or a node (e.g., a processing node 44) implementing one or more of the functions 54 of the network node in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
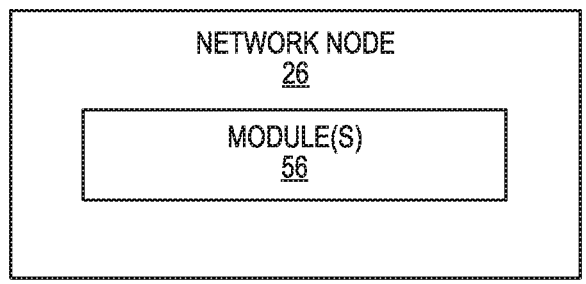

FIG. 11 is a schematic block diagram of the network node 26 according to some other embodiments of the present disclosure. The network node 26 includes one or more modules 56, each of which is implemented in software. The module(s) 56 provide the functionality of the network node 26 described herein. For example, the module(s) 56 may include one or modules that perform the operations of the RAN_Pico node described with respect to FIG. 6, one or more modules that perform the operations of the RAN_Pico node of FIG. 7, and/or one or more modules that operate to perform the operations of the RAN_Node of FIG. 8.

Figure 12:
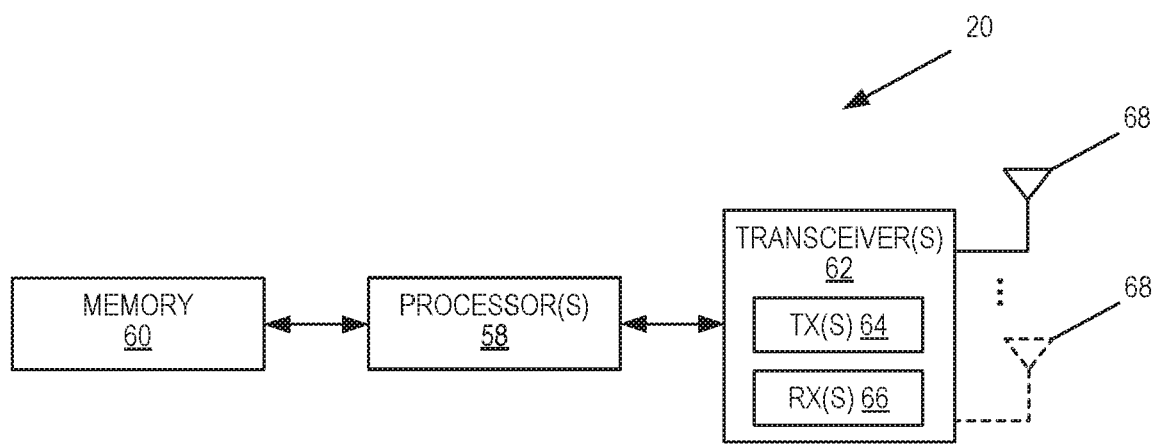
FIGS. 12 and 13 illustrate example embodiments of a UE.

FIG. 12 is a schematic block diagram of the UE 20 according to some embodiments of the present disclosure. As illustrated, the UE 20 includes processing circuitry that includes one or more processors 58 (e.g., CPUs, ASICs, FPGAs, and/or the like). The UE 20 further includes memory 60, and one or more transceivers 62 each including one or more transmitters 64 and one or more receivers 66 coupled to one or more antennas 68. In some embodiments, the functionality of the UE 20 described above (e.g., the functionality of the UE 20 described with respect to FIGS. 6, 7, and/or 8) may be fully or partially implemented in software that is, e.g., stored in the memory 60 and executed by the processor(s) 58.

In some embodiments, a computer program including instructions which, when executed by at least one processor, causes the at least one processor to carry out the functionality of the UE 20 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
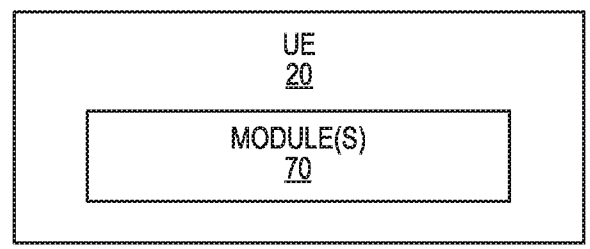

FIG. 13 is a schematic block diagram of the UE 20 according to some other embodiments of the present disclosure. The UE 20 includes one or more modules 70, each of which is implemented in software. The module(s) 70 provide the functionality of the UE 20 described herein. For example, the module(s) 70 may include one or modules that perform the operations of the UE described with respect to FIG. 6, one or more modules that perform the operations of the UE of FIG. 7, and/or one or more modules that operate to perform the operations of the UE of FIG. 8.

While not being limited thereto, some example embodiments of the present disclosure are provided below. In some embodiments, a method of operation of a first RAN node in a cellular communications network comprises storing a RAN context of a UE at a second RAN node, obtaining a RAN context identity of the RAN context of the UE stored at the second RAN node, and providing the RAN context identity to the UE. In some embodiments, providing the RAN context identity to the UE comprises providing the RAN context identity to the UE when releasing a connection of the UE. In some embodiments, the method further comprises making a decision to release the connection of the UE, wherein storing the RAN context of the UE at the second RAN node comprises storing the RAN context of the UE at the second RAN node upon making the decision to release the connection of the UE. In some embodiments, storing the RAN context of the UE at a second RAN node comprises sending a request to store the RAN context of the UE to the second RAN node, wherein the request comprises the RAN context of the UE, and obtaining the RAN context identity comprises receiving a response from the second RAN node in response to the request, wherein the response comprises the RAN context identity of the RAN context of the UE stored at the second RAN node. In some embodiments, the first RAN node is a LPN, and the second RAN node is a macro node.

In some embodiments, a first RAN node for a cellular communications network is adapted to store a RAN context of a UE at a second RAN node, obtain RAN context identity of the RAN context of the UE stored at the second RAN node, and provide the RAN context identity to the UE. Further, in some embodiments, the RAN node is further adapted to perform the method of operation of the first RAN node described above.

In some embodiments, a first RAN node for a cellular communications network comprises a communication interface, one or more transmitters, one or more processors, and memory storing instructions executable by the one or more processors whereby the first RAN node is operable to store, via the communication interface, a RAN context of a UE at a second RAN node, obtain RAN context identity of the RAN context of the UE stored at the second RAN node, and provide, via the one or more transmitters, the RAN context identity to the UE.

In some embodiments, a first RAN node for a cellular communications network comprises a storing module operable to store a RAN context of a UE at a second RAN node, an obtaining module operable to obtain RAN context identity of the RAN context of the UE stored at the second RAN node, and a providing module operable to provide the RAN context identity to the UE.

In some embodiments, a method of operation of a UE in a cellular communications network comprises receiving, from a first RAN node, a RAN context identity of a RAN context of the UE stored at a second RAN node. Further, in some embodiments, receiving the RAN context identity comprises receiving a connection release from the first RAN node, wherein the connection release comprises the RAN context identity. Further, in some embodiments, the first RAN node is a LPN and the second RAN node is a macro node.

In some embodiments, a UE for a cellular communications network is adapted to receive, from a first RAN node, a RAN context identity of a RAN context of the UE stored at a second RAN node. Further, in some embodiments, the UE is further adapted to operate according to any one of the embodiments of the UE described above.

In some embodiments, a UE for a cellular communications network comprises one or more receivers, one or more processors, and memory storing instructions executable by the one or more processors whereby the UE is operable to receive, from a first RAN node, a RAN context identity of a RAN context of the UE stored at a second RAN node.

In some embodiments, a UE for a cellular communications network comprises a receiving module operable to receive, from a first RAN node, a RAN context identity of a RAN context of the UE stored at a second RAN node.

In some embodiments, a method of operation of a RAN node in a cellular communications network comprises configuring a UE with a timer value T for a periodic updating timer. Further, in some embodiments, the timer value T is a function of whether the RAN node can reliably store a RAN context of the UE. In some embodiments, the timer value T is a function of one or more characteristics of the RAN node. In some embodiments, the timer value T is received from another network node. In some embodiments, the periodic update timer is a timer utilized by the UE for periodic updates when the UE is in a RAN inactive state. In some embodiments, the timer value is a first value if the RAN node is a macro node and a second value if the RAN node is a LPN, the second value being less than the first value. In some embodiments, configuring the UE with the timer value T comprises configuring the UE with the timer value T prior to releasing the UE. In some embodiments, configuring the UE with the timer value T comprises configuring the UE with the timer value T upon releasing the UE. In some embodiments, configuring the UE with the timer value T comprises sending a release message to the UE, wherein the release message comprises the timer value T.

In some embodiments, a RAN node for a cellular communications network is adapted to configure a UE with a timer value T for a periodic updating timer. Further, in some embodiments, the RAN node is further adapted to perform the method of any one of the embodiments of the method of operation of the RAN node describe above.

In some embodiments, a RAN node for a cellular communications network comprises one or more transmitters, one or more processors, and memory storing instructions executable by the one or more processors whereby the RAN node is operable to configure a UE with a timer value T for a periodic updating timer.

In some embodiments, a RAN node for a cellular communications network comprises a timer configuration module operable to configure a UE with a timer value T for a periodic updating timer.

In some embodiments, a method of operation of a RAN node in a cellular communications network comprises making a connection release decision for a UE, wherein the connection release decision is either a decision to release the UE to a CN IDLE state or a RAN inactive state, releasing the UE to the CN IDLE state if the connection release decision is a decision to release the UE to the CN IDLE state, wherein a RAN context of the UE is not stored in the RAN when the UE is in the CN IDLE state, and releasing the UE to the RAN inactive state if the connection release decision is a decision to release the UE to the RAN inactive state, wherein the RAN context of the UE is stored in the RAN when the UE is in the RAN inactive, and thus CN CONNECTED, state. In some embodiments, making the connection release decision comprises making the connection release decision based on an ability of the RAN node to reliably store the RAN context of the UE. In some embodiments, the connection release decision is a decision to release the UE to the CN IDLE state if the RAN node is a LPN.

In some embodiments, a RAN node for a cellular communications network is adapted to make a connection release decision for a UE, wherein the connection release decision is either a decision to release the UE to a CN IDLE state or a RAN inactive state, release the UE to the CN IDLE state if the connection release decision is a decision to release the UE to the CN IDLE state, wherein a RAN context of the UE is not stored in the RAN node when the UE is in the CN IDLE state, and release the UE to the RAN inactive state if the connection release decision is a decision to release the UE to the RAN inactive state, wherein the RAN context of the UE is stored in the RAN node when the UE is in the RAN inactive, and thus CN CONNECTED, state. In some embodiments, the RAN node is further adapted to perform the method of operation of the RAN node in accordance with any one of the embodiments described above.

In some embodiments, a RAN node for a cellular communications network comprises one or more transmitters, one or more processors, and memory storing instructions executable by the one or more processors whereby the first RAN node is operable to make a connection release decision for a UE, wherein the connection release decision is either a decision to release the UE to a CN IDLE state or a RAN inactive state, release the UE to the CN IDLE state if the connection release decision is a decision to release the UE to the CN IDLE state, wherein a RAN context of the UE is not stored in the RAN node when the UE is in the CN IDLE state, and release the UE to the RAN inactive state if the connection release decision is a decision to release the UE to the RAN inactive state, wherein the RAN context of the UE is stored in the RAN node when the UE is in the RAN inactive, and thus CN CONNECTED, state.

In some embodiments, a RAN node for a cellular communications network comprises a decision module operable to make a connection release decision for a UE, wherein the connection release decision is either a decision to release the UE to a CN IDLE state or a RAN inactive state, and a connection release module operable to release the UE to the CN IDLE state if the connection release decision is a decision to release the UE to the CN IDLE state, wherein a RAN context of the UE is not stored in the RAN node when the UE is in the CN IDLE state, and release the UE to the RAN inactive state if the connection release decision is a decision to release the UE to the RAN inactive state, wherein the RAN context of the UE is stored in the RAN node when the UE is in the RAN inactive, and thus CN CONNECTED, state.

The following acronyms are used throughout this disclosure.

2G Second Generation
3GPP Third Generation Partnership Project
5G Fifth Generation
AIR Antenna Integrated Radio
AS Access Stratum
ASIC Application Specific Integrated Circuit
BSC Base Station Controller
CN Core Network
CPU Central Processing Unit
C-RNTI Cell Radio Network Temporary Identifier
DU Digital Unit
eNB Enhanced or Evolved Node B
EPC Evolved Packet Core
EPS Evolved Packet System
E-UTRAN Evolved Universal Terrestrial Radio Access Network
FPGA Field Programmable Gate Array
GPRS General Packet Radio System
GSM Global System for Mobile Communications
GTP-U General Packet Radio System Tunneling Protocol User Plane
GUTI Globally Unique Temporary Identity
HARQ Hybrid Automatic Repeat Request
HSPA High-Speed Packet Access
KeNB Enhanced or Evolved Node B Key
LPN Low Power Node
LTE Long Term Evolution
MAC Medium Access Control
MME Mobility Management Entity
MTC Machine Type Communication
NAS Non-Access Stratum
OAM Operations and Management
PDCP Packet Data Convergence Protocol
PDN Packet Data Network
P-GW Packet Data Network Gateway
PHY Physical Layer
QoS Quality of Service
RAN Radio Access Network
RAT Radio Access Technology
RB Resource Block
RBS Radio Base Station
RLC Radio Link Control
RLC-AM Radio Link Control Acknowledged Mode
RLC-UM Radio Link Control Unacknowledged Mode
RNC Radio Network Controller
ROHC Robust Header Compression
RRC Radio Resource Control
RRU Remote Radio Unit
SAE System Architecture Evolution
SCEF Service Capability Exposure Function
S-TMSI System Architecture Evolution Temporary Mobile Subscriber Identity
TS Technical Specification
UE User Equipment
UMTS Universal Mobile Telecommunications System
UTRAN Universal Terrestrial Radio Access Network
WCDMA Wideband Code Division Multiple Access Those skilled in the art will recognize improvements and modifications to the embodiments of the present disclosure. All such improvements and modifications are considered within the scope of the concepts disclosed herein.

The invention claimed is:

1. A method of operation of a Radio Access Network, RAN, node in a cellular communications network, comprising:
   sending, to a User Equipment, UE, a release message for moving the UE to a RAN controlled inactive state, during which state a UE RAN context is stored in the UE and in the RAN node, wherein the release message comprises a configuration of a timer value T set by the RAN node for a periodic updating timer; and
   receiving an update message from the UE upon expiry of the periodic updating timer.

2. The method of claim 1 wherein the timer value T is a function of whether the RAN node can reliably store the RAN context of the UE.

3. The method of claim 1 wherein the timer value T is a function of one or more characteristics of the RAN node.

4. The method of claim 1 wherein the timer value T is received from another network node.

5. The method of claim 1 wherein the periodic updating timer is a timer utilized by the UE for periodic updates when the UE is in a RAN inactive state.

6. The method of claim 1 wherein the timer value T is a first value if the RAN node is a macro node and a second value if the RAN node is a Low Power Node, LPN, having lower transmit power than a macro node, the second value being less than the first value.

7. The method of claim 1 further comprising:
   releasing a connection with the UE; and
   after releasing the connection with the UE, receiving the update message from the UE upon expiry of the periodic updating timer.

8. A Radio Access Network, RAN, node for a cellular communications network, the RAN node comprising:
   one or more transmitters; and
   processing circuitry configured to:
     send, to a User Equipment, UE, a release message for moving the UE to a RAN controlled inactive state, during which state a UE RAN context is stored in the UE and in the RAN node, wherein the release message comprises a configuration of a timer value T set by the RAN node for a periodic updating timer; and
     receive an update message from the UE upon expiry of the periodic updating timer.

9. The RAN node of claim 8 wherein the timer value T is a function of whether the RAN node can reliably store the RAN context of the UE.

10. The RAN node of claim 8 wherein the timer value T is a function of one or more characteristics of the RAN node.

11. The RAN node of claim 8 wherein the timer value T is received from another network node.

12. The RAN node of claim 8 wherein the periodic updating timer is a timer utilized by the UE for periodic updates when the UE is in a RAN inactive state.

13. The RAN node of claim 8 wherein the timer value T is a first value if the RAN node is a macro node and a second value if the RAN node is a Low Power Node, LPN, having lower transmit power than a macro node, the second value being less than the first value.

14. The RAN node of claim 8 wherein the RAN node is further operable to:
  release a connection with the UE; and
  after releasing the connection with the UE, receive the update message from the UE upon expiry of the periodic updating timer.

15. A method of operation of a User Equipment, UE, in a cellular communications network, comprising:
  receiving, from a Radio Access Network, RAN, node, a release message for moving the UE to a RAN controlled inactive state, during which state a UE RAN context is stored in the UE and in a RAN base station, where the release message comprises a configuration of a timer value T set by the RAN node for a periodic updating timer;
  starting the periodic updating timer at entry of the RAN controlled inactive state; and
  upon expiry of the periodic updating timer, sending a periodic update message to the RAN node as triggered by the expiry of the periodic updating timer.

16. The method of claim 15 further comprising, upon transitioning from the RAN controlled inactive state to an active state, rebuilding the RAN context of the UE if needed.

17. The method of claim 15 wherein the timer value T is a function of whether the RAN node can reliably store the RAN context of the UE.

18. The method of claim 15 wherein the timer value T is a function of one or more characteristics of the RAN node.

19. A User Equipment, UE, for a cellular communications network, the UE comprising:
  one or more transmitters;
  one or more receivers; and
  processing circuitry configured to:
    receive, from a Radio Access Network, RAN, node, a release message for moving the UE to a RAN controlled inactive state, during which state a UE RAN context is stored in the UE and in a RAN base station, where the release message comprises a configuration of a timer value T set by the RAN node for a periodic updating timer;
    start the periodic updating timer at entry of the RAN controlled inactive state; and
    upon expiry of the periodic updating timer, send a periodic update message to the RAN node as triggered by the expiry of the periodic updating timer.

20. The UE of claim 19 further comprising, upon transitioning from the RAN controlled inactive state to an active state, rebuilding the RAN context of the UE if needed.

21. The UE of claim 19 wherein the timer value T is a function of whether the RAN node can reliably store the RAN context of the UE.

22. The UE of claim 19 wherein the timer value T is a function of one or more characteristics of the RAN node.

* * * * *